(12) United States Patent
Fujimoto et al.

(10) Patent No.: US 6,449,099 B2
(45) Date of Patent: Sep. 10, 2002

(54) LENS ARRAY AND LENS ARRAY ASSEMBLY

(75) Inventors: Hisayoshi Fujimoto; Toshihiko Takakura, both of Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/812,575

(22) Filed: Mar. 21, 2001

(30) Foreign Application Priority Data

Mar. 23, 2000 (JP) ......................................... 2000-082476

(51) Int. Cl.[7] ............................................... G02B 27/10
(52) U.S. Cl. ....................................... 359/621; 359/619
(58) Field of Search .................................. 359/811, 806, 359/618, 619, 620, 621, 622, 623, 455, 459

(56) References Cited

U.S. PATENT DOCUMENTS

| | | | |
|---|---|---|---|
| 5,570,204 A | * | 10/1996 | Kumashiro ................. 358/471 |
| 5,644,431 A | * | 7/1997 | Magee ........................ 359/619 |
| 5,687,024 A | * | 11/1997 | Yoshimura et al. ......... 359/455 |
| 5,897,184 A | * | 4/1999 | Eichenlaub et al. .......... 349/64 |

FOREIGN PATENT DOCUMENTS

| | | | |
|---|---|---|---|
| JP | 11-023805 | 1/1999 | ............ G02B/3/00 |

* cited by examiner

*Primary Examiner*—Georgia Epps
*Assistant Examiner*—Saeed Seyrafi
(74) *Attorney, Agent, or Firm*—Michael D. Bednarek; Shaw Pittman LLP

(57) ABSTRACT

A lens array is provided with a plurality of lenses and a holder formed integral with the lenses. Each of the lenses includes a non-flat first lens surface and a flat second lens surface. The holder includes a first surface adjacent to the first lens surface and a second surface adjacent to the second lens surface. The second surface is formed with a plurality of recesses in each of which a light shielding layer is provided.

12 Claims, 14 Drawing Sheets

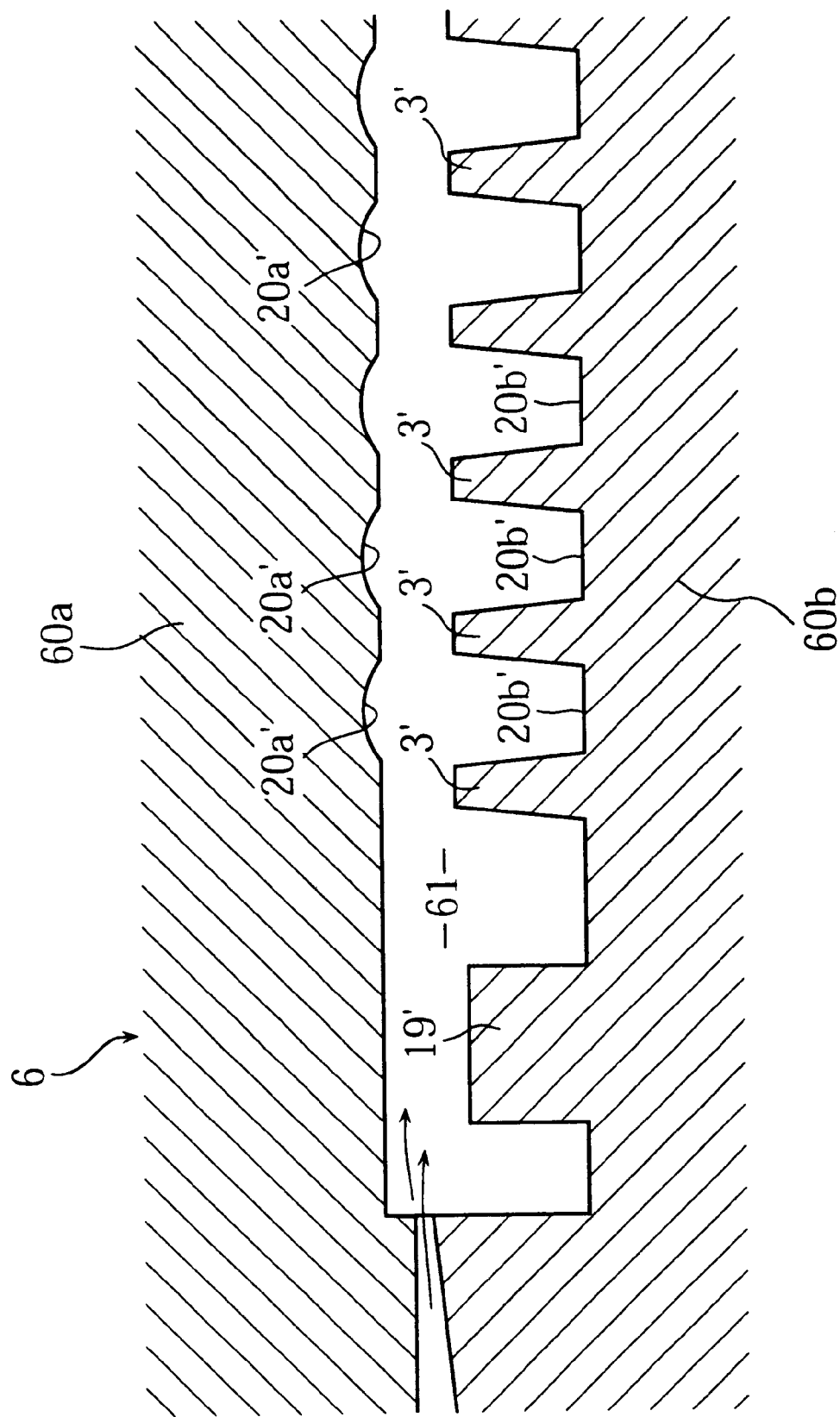

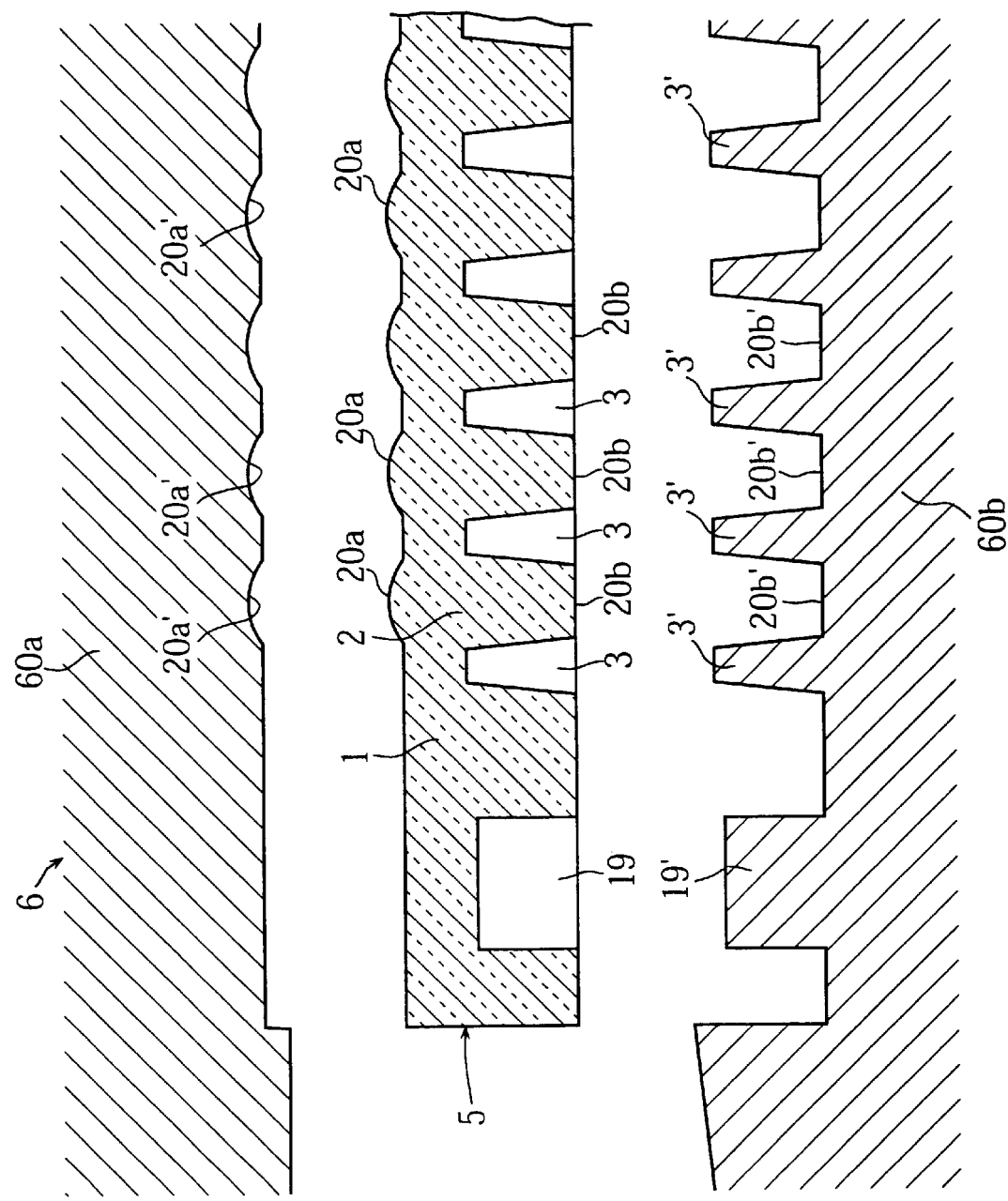

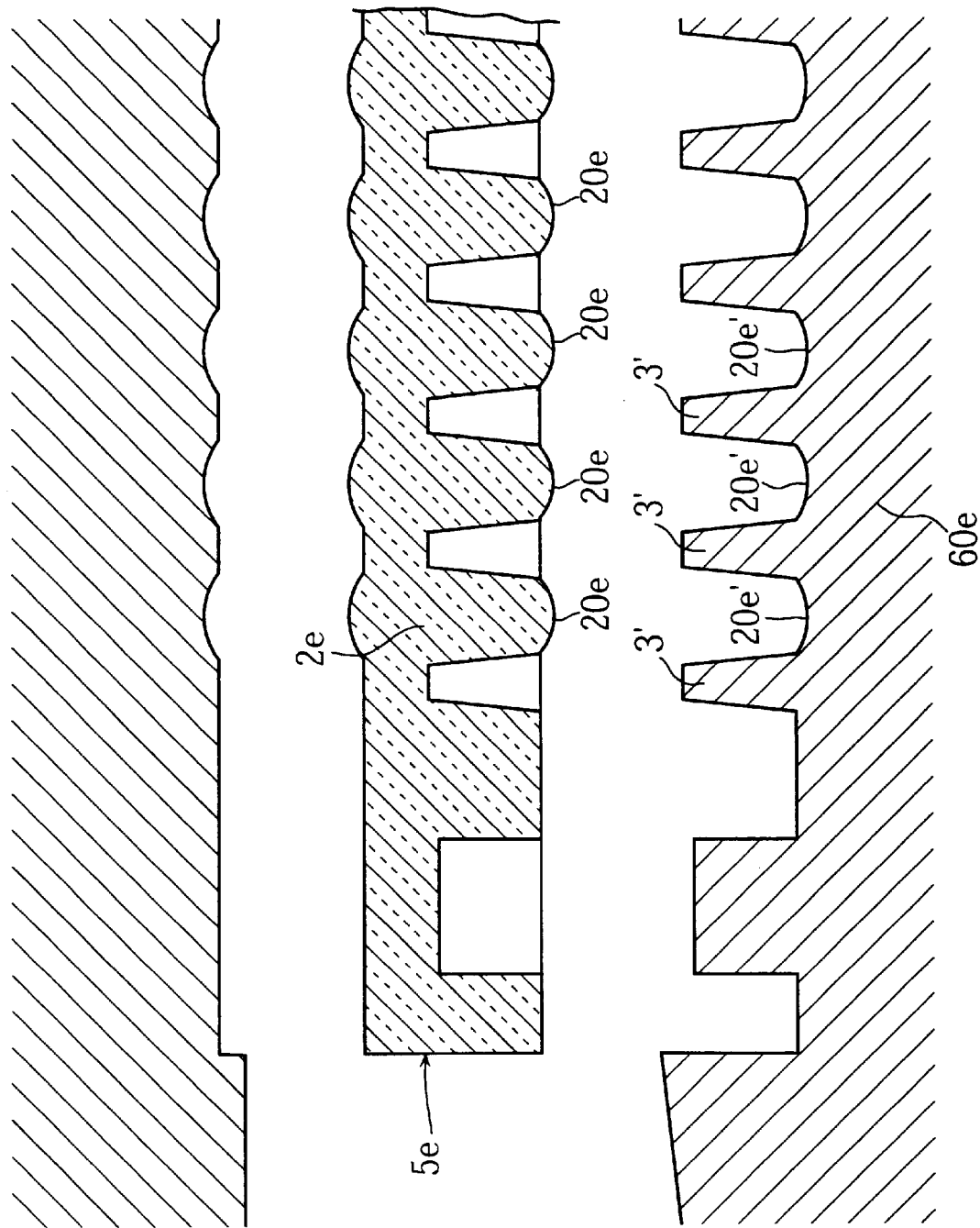

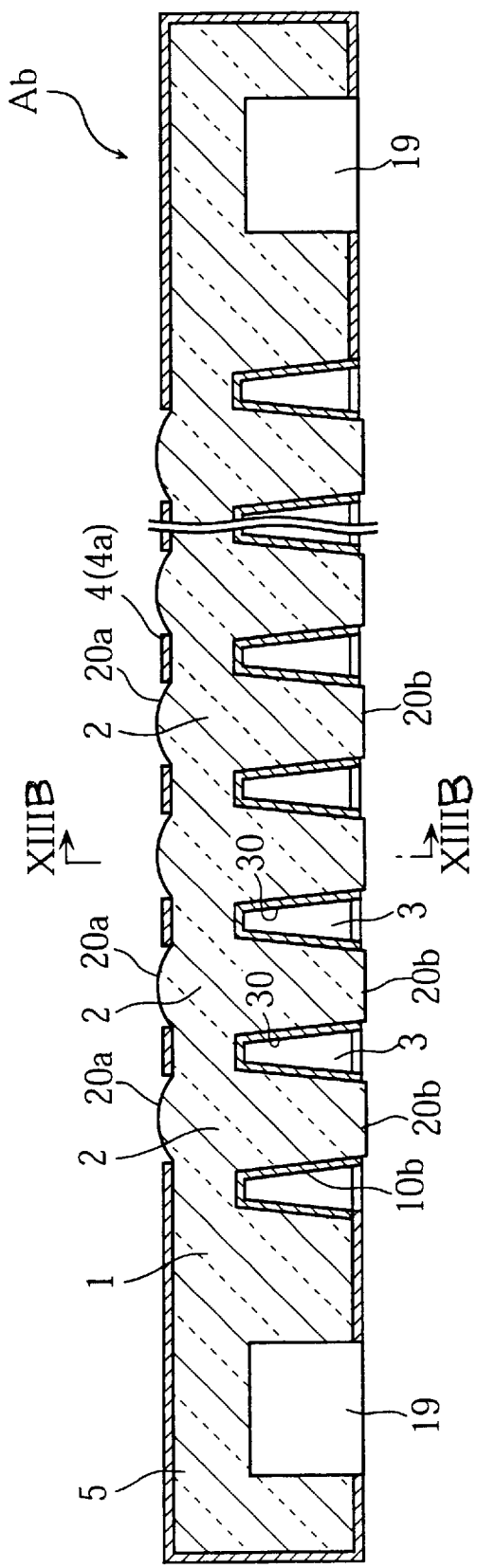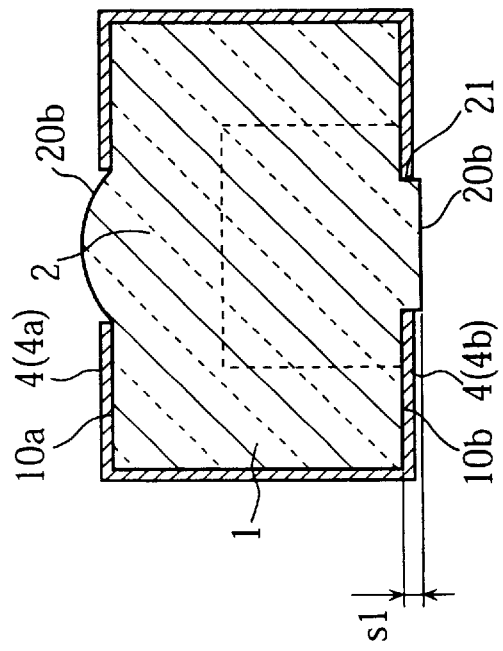

LENS ARRAY AND LENS ARRAY ASSEMBLY

BACKGROUND OF THE INVENTION

1. Field of the invention:

The present invention relates to a lens array and a lens array assembly used for e.g. an image reading apparatus.

2. Description of the Related Art:

As is known, a typical image reading apparatus includes a plurality of light receiving elements arranged in a line for receiving light reflected on a document to be read. For enabling proper image reading operation, the reflected light needs to be accurately focused onto the light receiving elements. To this end, use may be made of a lens array provided with an array of focusing lenses.

In a conventional lens array, a plurality of convex lenses (made of e.g. glass) are linearly arranged at regular intervals and held together by a resin holder prepared separately from the lenses. In place of the convex lenses, self-focusing lenses may be used for obtaining a non-inverted and non-magnified image.

The conventional lens array has the following disadvantage. As mentioned above, the plurality of the lenses and the holder are prepared separately, to be combined later. In this manner, however, the assembling process of the lens array tends to become complicated due to many small lenses (their diameter may be less than 1 mm) to be handled. Consequently, the yield of the conventional lens arrays is rather low, and the production cost becomes unduly high.

SUMMARY OF THE INVENTION

The present invention has been proposed under the circumstances described above. It is, therefore, an object of the present invention to provide an inexpensive lens array having an excellent optical performance.

Another object of the present invention is to provide a lens array assembly incorporating such a lens array.

According to a first aspect of the present invention, there is provided a lens array including a plurality of lenses and a holder formed integral with the lenses. Each of the lenses includes a first lens surface and a second lens surface. The second lens surface is flat. The holder includes a first surface adjacent to the first lens surface and a second surface adjacent to the second lens surface. A plurality of recesses are formed in the second surface of the holder.

Preferably, the lenses and the holder may be made of a transparent synthetic resin material.

Preferably, the recesses and the lenses are arranged alternately.

Preferably, the first lens surface of each lens may be convex or concave.

Preferably, each of the recesses of the holder may be provided with dark-colored light shielding means.

Preferably, the second surface of the holder may be covered with dark-colored light shielding means defining the second lens surface of each lens.

Preferably, the second lens surface of each lens may project from the second surface of the holder.

Preferably, the first surface of the holder may be covered with dark-colored light shielding means.

According to a second aspect of the present invention, there is provided a lens array assembly including at least first and second lens arrays. The first lens array includes a plurality of first lenses and a first holder formed integral with the first lenses, while the second lens array includes a plurality of second lenses and a second holder formed integral with the second lenses. The second lens array is fixed to the first lens array. Each of the first lenses includes a non-flat first lens surface and a flat second lens surface opposite to the first lens surface. The first holder is formed with a plurality of recesses adjacent to the second lens surfaces.

Preferably, the first lens array may be formed with a positioning hole, and the second lens array may be formed with a projection fitted into the positioning hole.

Preferably, each of the second lenses may include first and second lens surfaces which are both convex.

Other features and advantages of the present invention will become apparent from the detailed description given below with reference to the accompanying drawings.

BRIEF DESCRIPTION OF THE DRAWINGS

FIGS. 5 and 6 illustrate how the lens array is fabricated;

FIGS. 7 and 8A–8B show a method of fabricating a lens array different from the lens array of the present invention;

FIG. 13A is a sectional view showing another example of a lens array embodying the present invention;

FIG. 13B is a sectional view taken along lines XIII—XIII in FIG. 13A;

DETAILED DESCRIPTION OF THE PREFERRED EMBODIMENTS

The preferred embodiments of the present invention will be described below with reference to the accompanying drawings.

FIGS. 1–4 show a lens array A according to the present invention. As seen from FIG. 1 or 2, the lens array A includes a transparent resin bar 5 and dark-colored (preferably, black) light shielding layers 4, 30 formed on the resin bar 5. The resin bar 5 is provided with a plurality of lenses 2 regularly arranged in the longitudinal direction of the bar 5. The remaining part of the resin bar 5 is a holder 1 formed integral with the lenses 2. The resin bar 5 may be made of a highly transparent synthetic resin such as polymethylmethacrylate (PMMA) and polycarbonate (PC).

Figure 1:
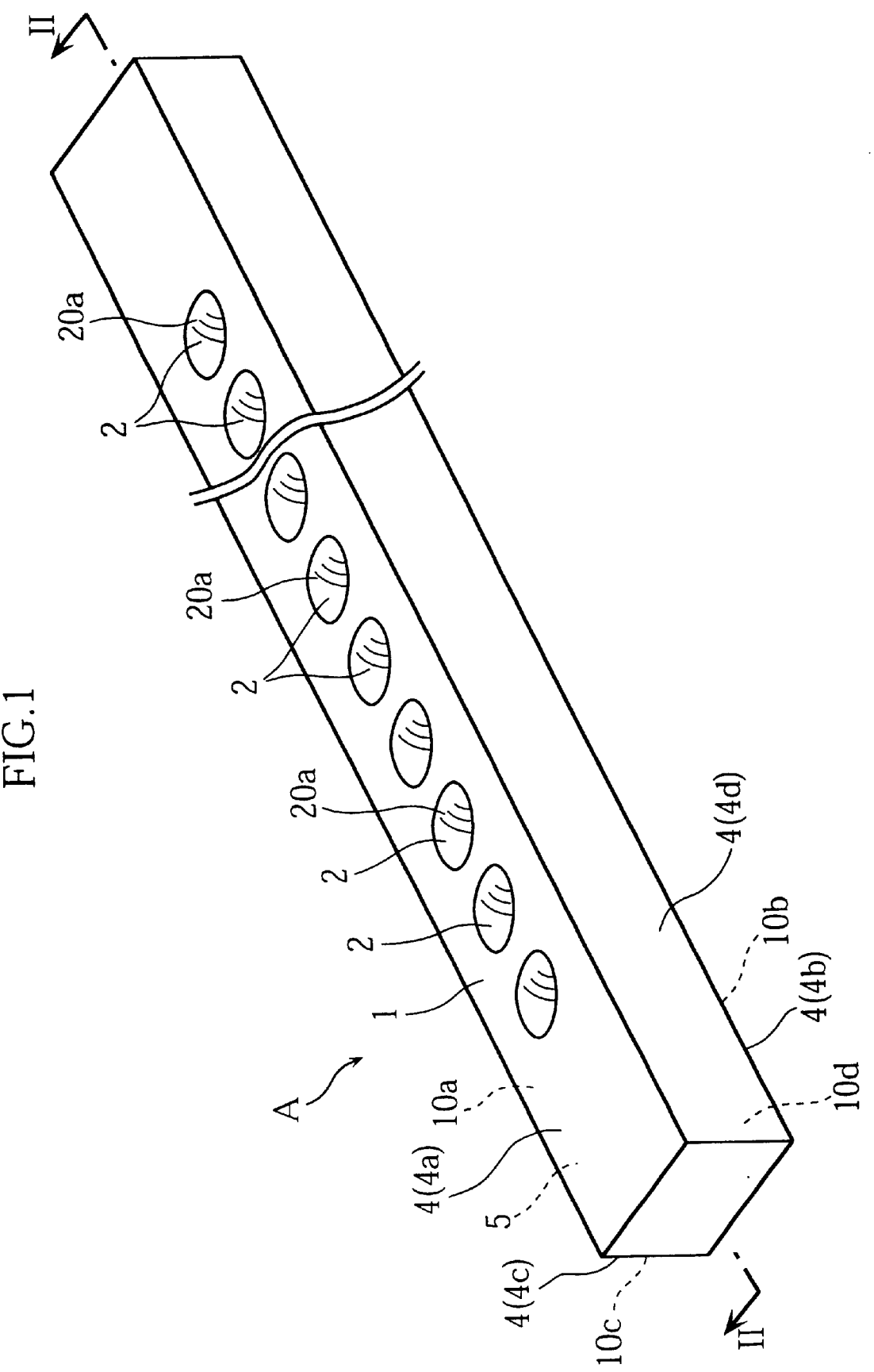
FIG. 1 is a perspective view showing a lens array embodying the present invention.
Figure 2:
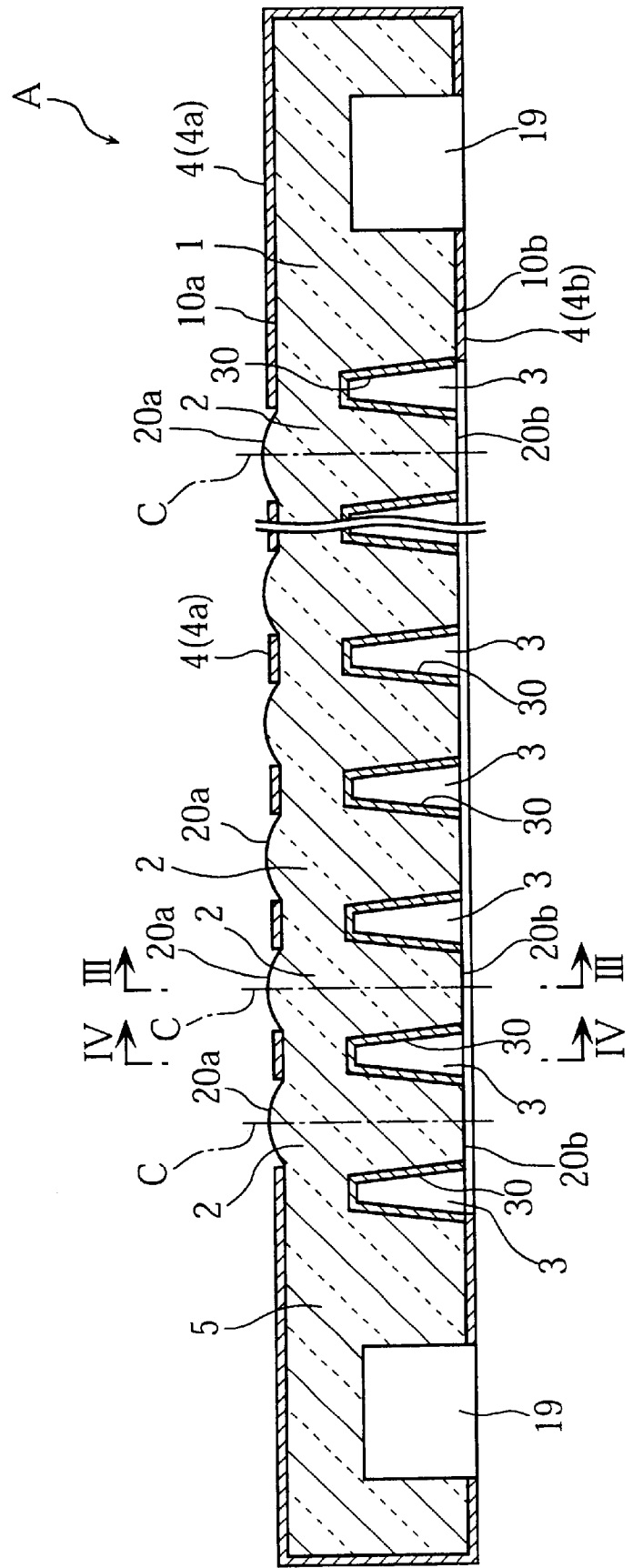
FIG. 2 is a sectional view taken along lines II—II in FIG. 1.
Figure 3:
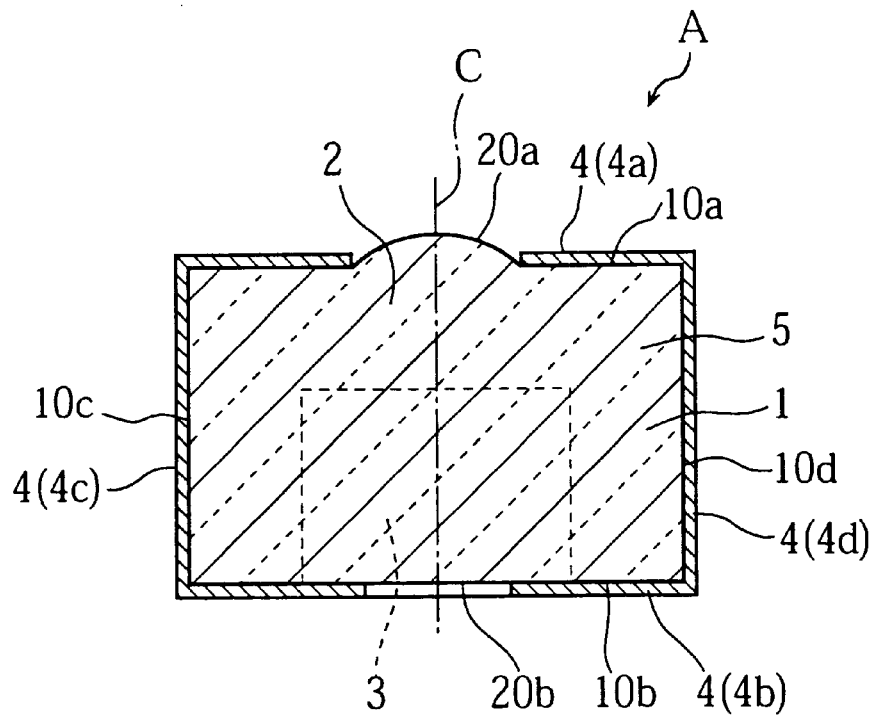
FIG. 3 is a sectional view taken along lines III—III in FIG. 2.

Each of the lenses 2 is provided with a convex lens surface 20a and a flat lens surface 20b opposite to the convex surface 20a. As shown in FIGS. 2 and 3, the optical axis C of each lens 2 extends through the thickness of the resin bar 5. The convex lens surface 20a may be spherical or aspherical. A spherical lens surface can be produced more readily than an aspherical lens surface. On the other hand, an aspherical lens surface is advantageous to reducing aberration, thereby improving the optical performance of the lens 2. The diameter of the lens surface 20a may be about 0.6 mm in the illustrated example. As shown in FIG. 3, the convex lens surface 20a projects from the upper surface 10a of the holder 1, while the flat lens surface 20b is flush with the lower surface 10b of the holder 1. The flat lens surface 20b is defined by an opening formed in the light shielding layer 4(4b) covering the lower surface 10b of the holder 1. Thus, the configuration, size or position of the lens surface 20b is readily altered by changing the configuration, size or position of the opening of the light shielding layer 4.

Figure 4:
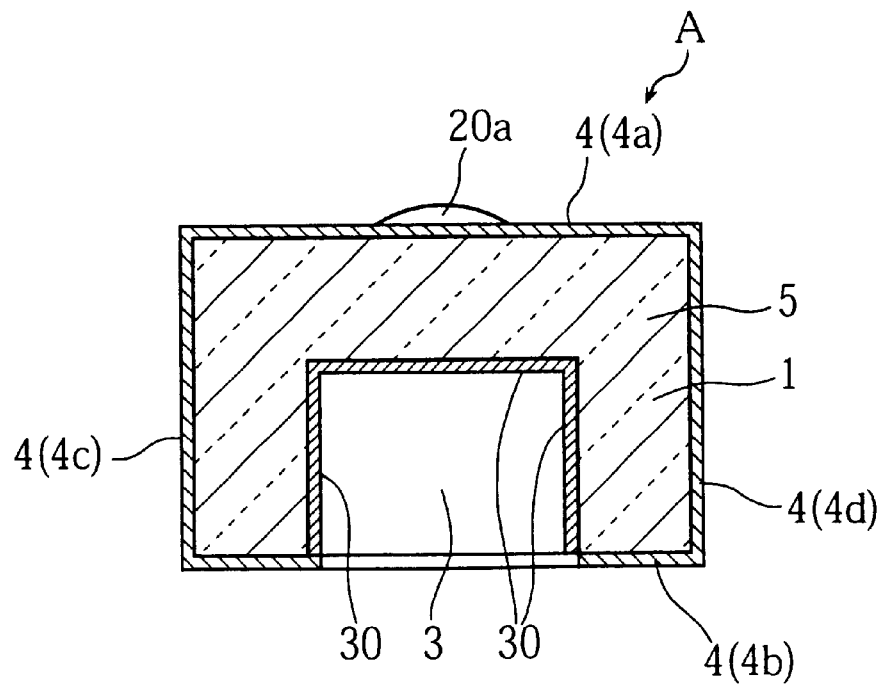
FIG. 4 is a sectional view taken along lines IV—IV in FIG. 2.

As shown in FIGS. 2 and 4, the resin bar 5 is formed, on its lower side, with a plurality of recesses 3 arranged regularly. As best shown in FIG. 2, any two adjacent recesses 3 flank the lower part of the relevant lens 2. As shown in FIG. 4, each recess 3 is smaller in width than the resin bar 5 but greater than the lens 2. The wall surfaces of each recess 3 are covered with the above light shielding layer 30 for preventing the cross talk of light between two adjacent lenses 2.

The other light shielding layer 4 includes first to fourth portions 4a–4d. The first portion 4a covers the upper surface 10a of the holder 1, the second portion 4b covers the lower surface 10b, the third portion 4c covers one side surface 10c, and the fourth portion 4d covers the other side surface 10d. Care should be taken so that the first portion 4a of the shielding layer 4 does not cover the convex lens surface 20a of each lens 2, as shown in FIGS. 2 and 3. The light shielding layer 4 (and the other light shielding layer 30 as well) may be formed by a paint applying technique.

As shown in FIG. 2, the holder 1 is formed, in its lower surface 10b, with a pair of positioning holes 19. As will be described later, the positioning holes 19 are used in combining the lens array A and another lens array to produce a lens array assembly.

According to the present invention, the lens array A may be produced in the following manner. First, a mold 6 as shown in FIG. 5 is prepared. The mold 6 consists of an upper molding member 60a and a lower molding member 60b. The upper molding member 60a is formed with a plurality of dents 20a', while the lower molding member 60b is formed with a plurality of projections 3'and 19'.

Then, a transparent resin material in a fluid state is poured into the cavity 61 defined by these molding members. After the supplied resin material has solidified, the upper and the lower molding members 60a, 60b are separated from each other, as shown in FIG. 6, so that the resin bar 5 is taken out.

In the illustrated example, only one resin bar 5 is depicted as being obtained at one time, though the present invention is not limited to this. For instance, the mold 6 may be arranged to define a plurality of identical cavities for producing a predetermined number of resin bars collectively.

The lower molding member 60b is provided with a flat molding surface 20b' between two adjacent projections 3' for forming the flat lower lens surface 20b of the lens 2. Such a flat molding surface is advantageous since it is obtained more easily than a curved surface. Specifically, it is now supposed that a resin bar 5e as shown in FIG. 7 is to be produced. The resin bar 5e is formed with a plurality of lenses 2e each having a convex lower lens surface 20e. To produce such a convex lens surface, the lower molding member 60e needs to be provided with an accordingly curved dent 20e' between the adjacent projections 3'.

Figure 8A:
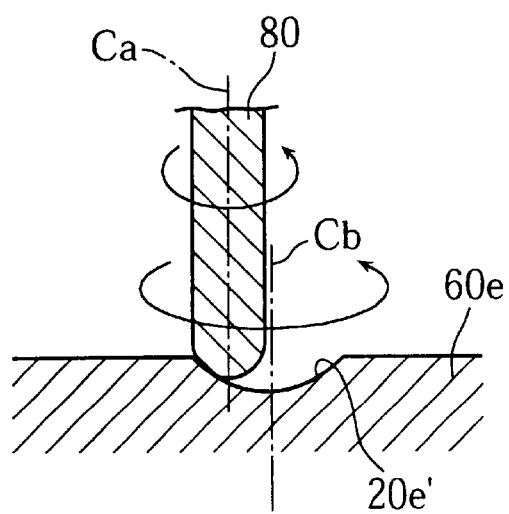
Figure 8B:
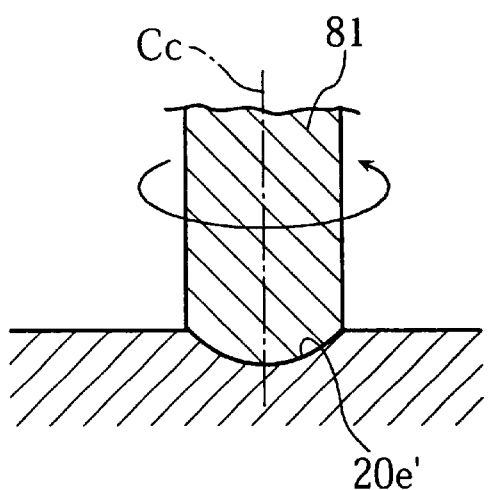

Referring to FIG. 8B, the dent 20e' can be made with the use of a cutting tool 81 rotating about the stationary axis Cc. As seen from the figure, the maximum diameter of the tool 81 is substantially equal to the maximum diameter of the required dent 20e'. In this case, however, the obtained surface of the dent 20e' may fail to be smooth enough because the processing ability of the tool 81 may not be equal in places.

To overcome the above problem, use maybe made of a cutting tool 80, as shown in FIG. 8A, whose maximum diameter is much smaller than the maximum diameter of the required dent 20e'. During a cutting operation, the cutting tool 80 is rotated about its central axis Ca, while also being moved around the central axis Cb of the dent 20e' and radially of the dent 20e'. In this manner, the milled surface of the dent 20e' will become appropriately smooth.

However, it is difficult to properly perform the technique of FIG. 8A with the lower molding member 60e of FIG. 7 since the projections 3' may interfere with the cutting tool 80 moved around the axis Cb of the dents 20e.

According to the present invention, the disadvantageous dents 20e' are replaced with flat surfaces 20b', as shown in FIG. 6. Thus, the lower molding member 60b is produced more readily than the molding member 60e of FIG. 7. Consequently, for instance, it is possible to reduce the pitch between the adjacent projections 3' more readily in the molding member 60b than in the molding member 60e.

After the resin bar 5 is produced, dark-colored paint is applied to the appropriate places of the surface of the holder 1, thereby forming light shielding layers 4 and 30. To this end, first the lens surfaces 20a and 20b of each lens 2 may be masked, and then black paint is applied to the exposed area of the resin bar 5. Then, the mask is removed from the lens surfaces 20a, 20b. Alternatively, no such a mask is formed on the holder 1. In this instance, use may be made of a precise inkjet printer capable of applying ink only to a desired spot.

Figure 9:
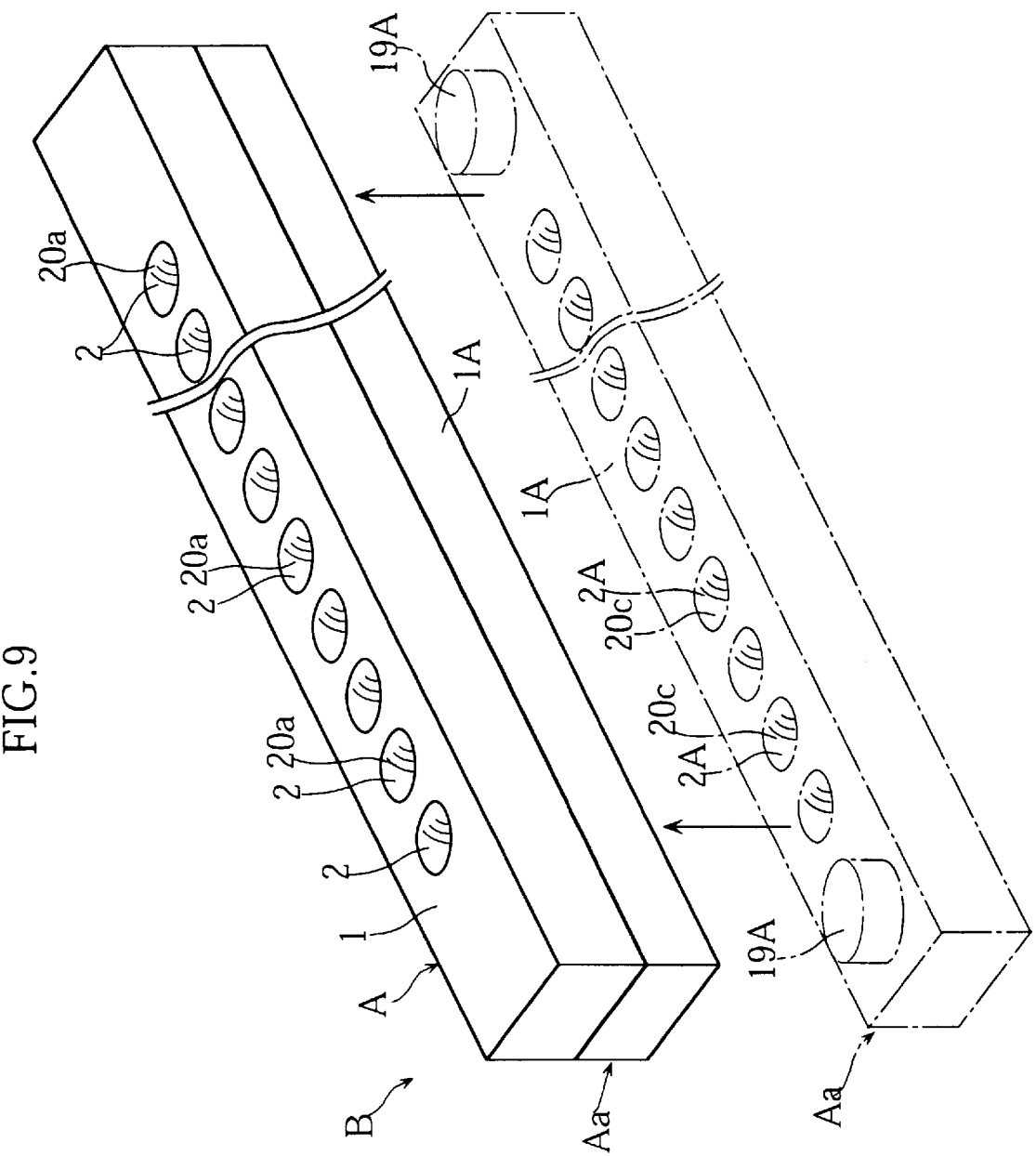
FIGS. 9 and 10 show a lens array assembly embodying the present invention.
Figure 10:
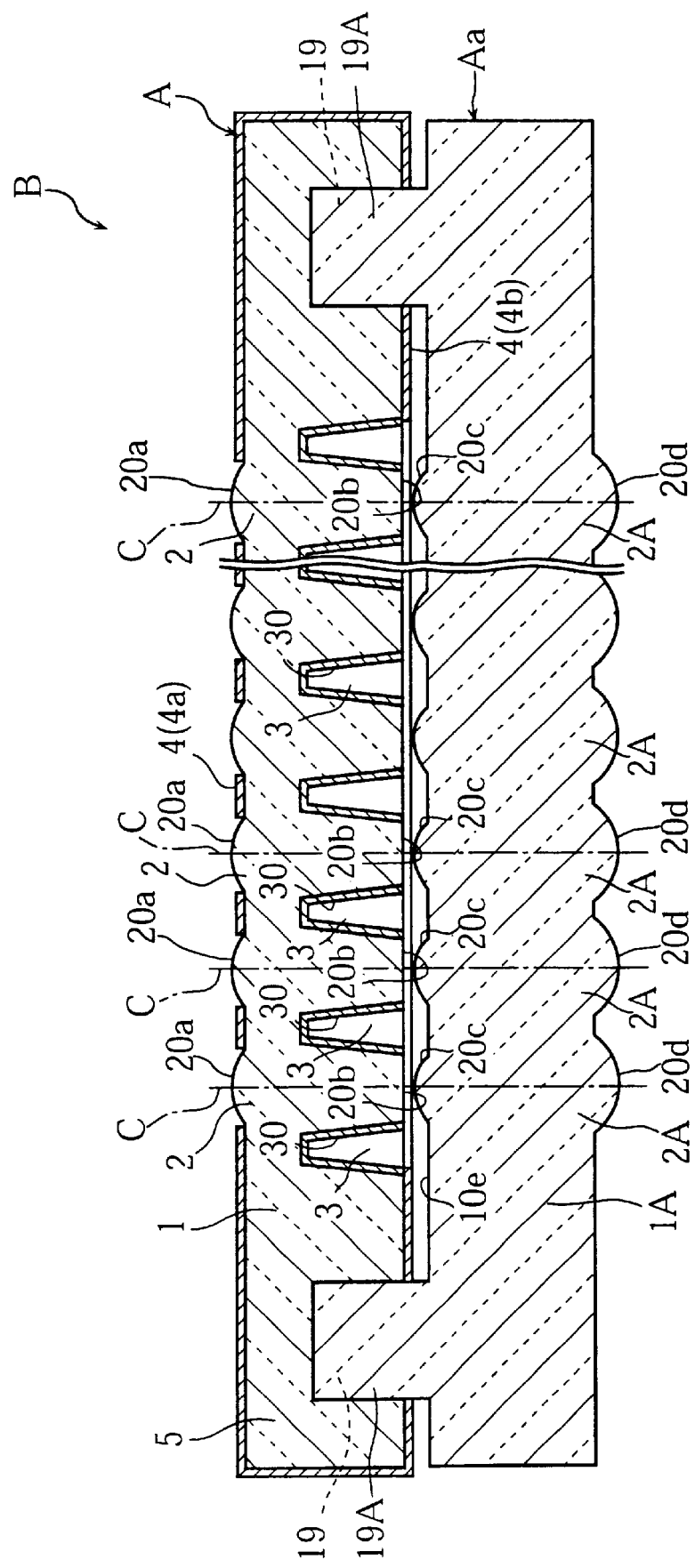

According to the present invention, a plurality of lenses and a holder are obtained integrally. Thus, the production cost is advantageously reduced, as compared to the case where the lenses are first prepared separately from the holder, and later the lenses and the holder are combined as a whole. Reference is now made to FIGS. 9 and 10 showing a lens array assembly B according to the present invention. The illustrated assembly B includes the above-described lens array A and another lens array Aa combined to the lens array A. As best shown in FIG. 10, the second lens array Aa is provided with a plurality of lenses 2A formed integral with a holder 1A. Each of the lenses 2A has a pair of convex lens surfaces 20c and 20d. As with the first lens array A, the second lens array Aa is also made of a transparent resin material. However, the second lens array Aa is not provided with such elements as the recesses 3, the positioning holes 19, and the light shielding layers 4, 30 present in the first lens array A.

The lens surfaces 20c and 20d may be spherical or aspherical. The curvatures of the respective lens surfaces 20c, 20d are so determined that the second lens array Aa, in cooperation with the first lens array A, projects the image of an original in a non-inverting and non-magnifying (and non-reducing) manner. The second lens array Aa is provided in its upper surface 10e with two projections 19A. By fitting the projections 19A into the positioning holes 19 of the first lens array A, the first and the second lens arrays A and Aa are readily fixed to and aligned with each other. In the aligned state, as shown in FIG. 10, the optical axis C of each lens 2 of the first lens array A coincides with the optical axis of the relevant one of the lenses 2A of the second lens array Aa.

Figure 11:
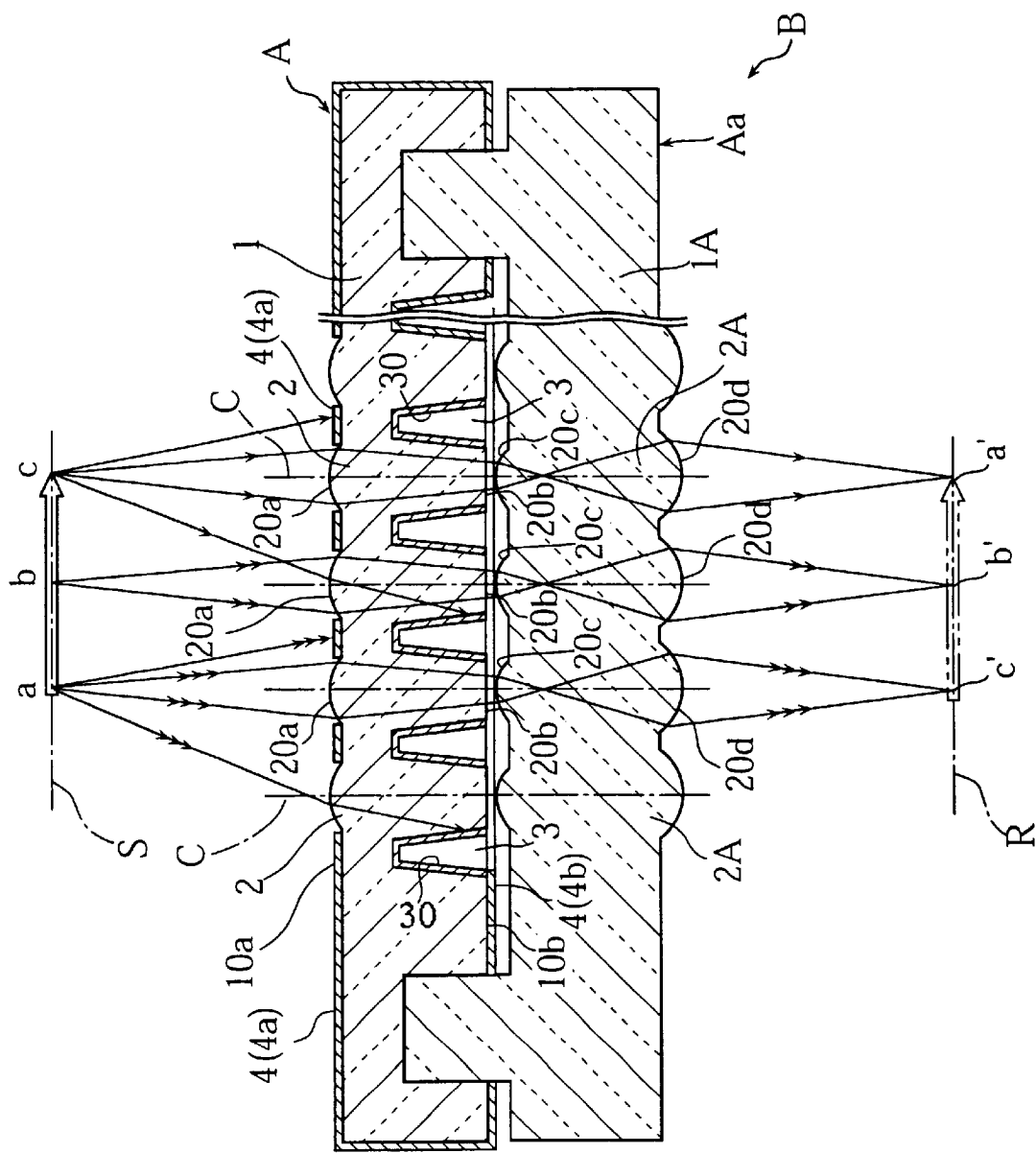
FIG. 11 illustrates the function of the lens array assembly.

FIG. 11 illustrates the optical function of the lens array assembly B. As shown in the figure, the light coming from the start line S passes through the lenses 2 of the first lens array A and the lenses 2A of the second lens array Aa, to be focused onto the image projecting line R. In this process, the original image is first reduced and inverted by the first to the third lens surfaces 20a–20c, and then magnified and inverted again by the fourth lens surface 20d, wherein the reduction rate and the magnification rate are the same. Thus, the image of an arrow a-b-c is projected onto the line R as a non-inverted and non-magnified figure a'-b'-c'.

In the above-described lens array assembly B, the light shielding layer 4(4a) allows the light coming from the start line S to enter only the first lens surfaces 20a, while the light shielding layer 30 prevents the cross talk of light between the adjacent lenses 2. Thus, once light passes through any one of the lenses 2 of the first lens array A, it will not reenter another lens 2 of the same array, but will enter the appropriate one of the lenses 2A of the second lens array Aa. Further, since the lower surface 10b of the holder 1 is covered with the light shielding layer 4(4b) except the lens surfaces 20b, the light is emitted only from the lens surfaces 20b toward the second lens array Aa. With these arrangements, a clear non-inverted and non-magnified picture is obtained with the lens array assembly B.

In the above-described embodiment, the second lens array Aa does not suffer from any cross talk of light even with no light shielding layers provided. This is because the light coming from the start line S has been well organized as passing through the first lens array A, so that it does not undergo any large deviation as passing through the second lens array Aa. Such a no light shielding layer structure is advantageous to making the lens array assembly B at a lower cost.

Figure 12:
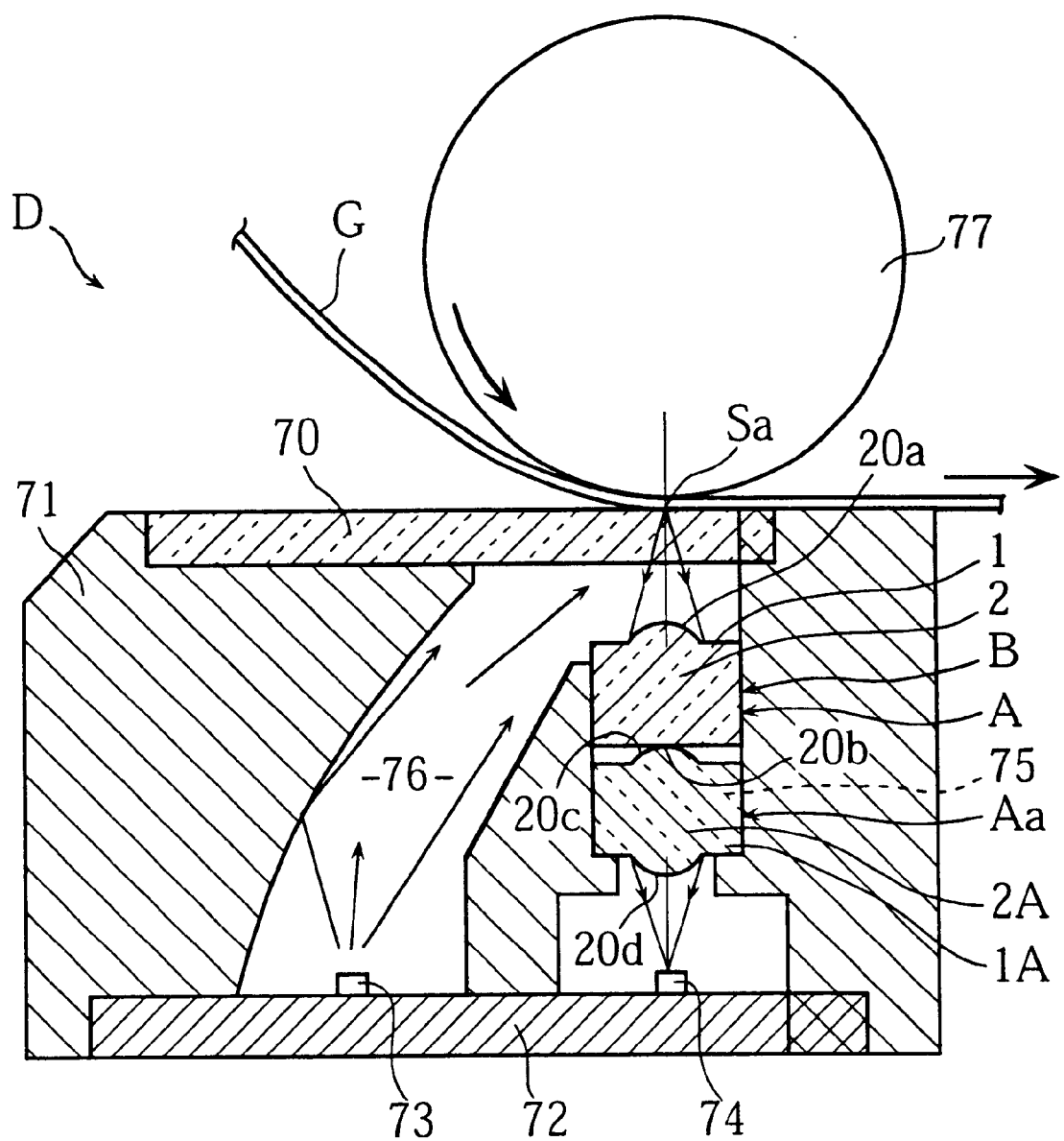
FIG. 12 is a sectional view showing an image reading apparatus incorporating the lens array assembly.

FIG. 12 shows, in section, an image reading apparatus D incorporating the above-described lens array assembly B. The apparatus D includes a transparent platen 70, a synthetic resin housing 71, an elongated insulating substrate 72 attached to the bottom of the housing 71, a light source 73 mounted on the substrate 72, and a plurality of light receiving elements 74 which are also mounted on the substrate 72. The light source 73 may include a plurality of light-emitting diodes (LEDs) arranged in an array extending longitudinally of the substrate 72.

The housing 71 is formed with an elongated slit 75 into which the lens array assembly B is fitted. In this position, the lens array assembly B is located between the platen 70 and the light receiving elements 74. The housing 71 is also formed with a light passage 76 for guiding light from the light source 73 to the image reading line Sa on the platen 70. A document G to be read is held in sliding contact with the platen 70 by a platen roller 77.

In operation, the document G at the image reading line Sa is illuminated by the light source 73, and the light reflected on the document G enters the lens array assembly B. After passing through the lenses 2 and 2A of the assembly B, the light is focused onto the light receiving elements 74. Upon this, each of the light receiving elements 74 will output an image signal corresponding to the received light. Then, the document G is forwarded in the secondary scanning direction by a predetermined amount to perform the next one-line image reading operation.

Referring now to FIGS. 13A and 13B, another example of a lens array is described. The illustrated lens array Ab is basically similar to the lens array A shown in FIG. 2, except that the lower end of each lens 2 projects downward by a predetermined amount s1 from the lower surface 10b of the holder 1. With such a projecting structure, it is possible to form the light shielding layer 4 accurately around the lower lens surface 20b of each lens 2. One possible way to form the layer 4 maybe to use a thermoplastic ink material. First, the ink material is applied roughly to the lower surface 10b of the holder 1 with the use of an inkjet printer. Then, the applied ink is heated up until it is fluidized. Advantageously, the fluidized ink is readily spread over the lower surface 10b of the holder 1, thereby properly surrounding the lower lens surfaces 20b.

Figure 14:
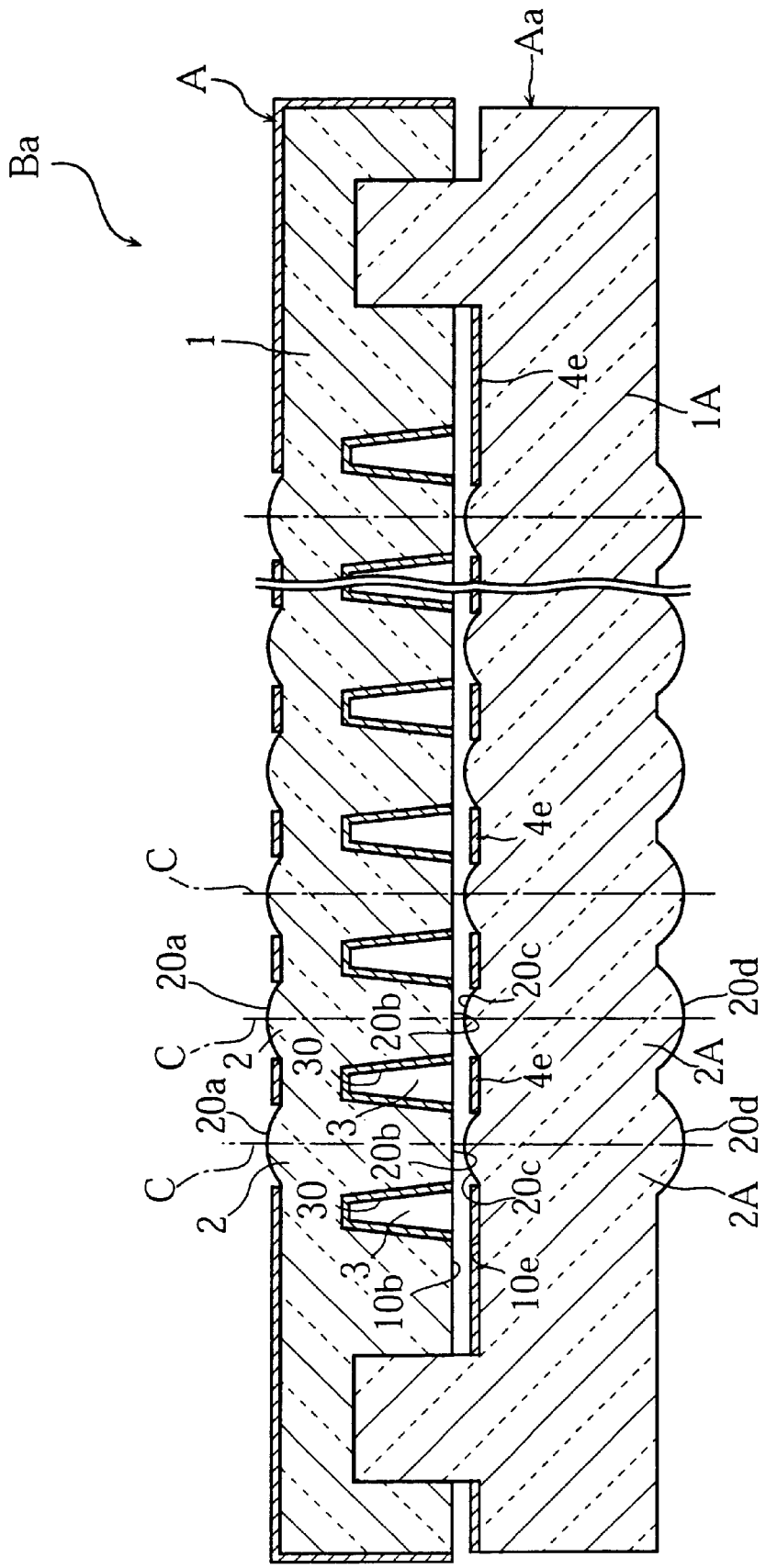
FIG. 14 is a sectional view showing another example of a lens array assembly embodying the present invention.

FIG. 14 shows another example of lens array assembly according to the present invention. The illustrated assembly Ba is basically similar to the assembly B shown in FIG. 10, except that the lower surface 10b is not covered with any light shielding layer, but the upper surface 10e of the lower holder 1A is covered with a light shielding layer 4e.

Figure 15:
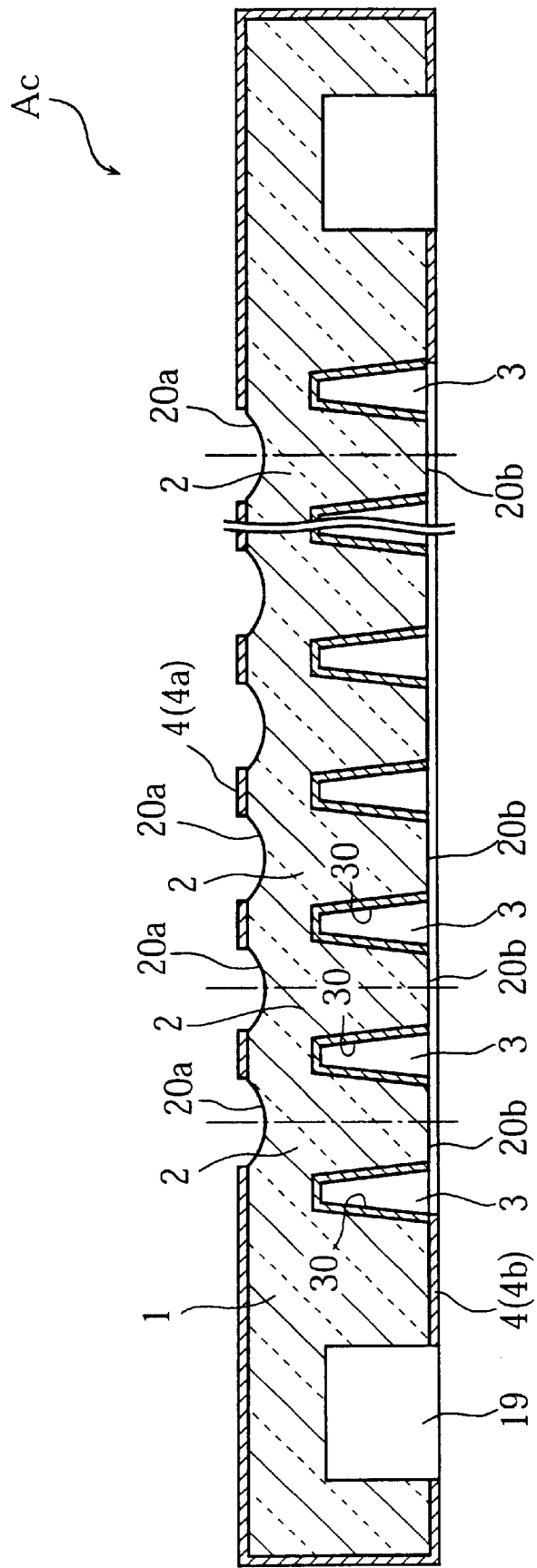
FIG. 15 is a sectional view showing another example of a lens array embodying the present invention.

FIG. 15 shows another example of lens array according to the present invention. The illustrated lens array Ac is basically similar to the lens array A shown in FIG. 2, except that the upper lens surfaces 20a are concave instead of being convex. The lens array Ac may be used in combination with two convex lens arrays. In this manner, it is possible to remove the chromatic aberration caused by the convex lens arrays.

According to the present invention, a plurality of lenses may be arranged in more than one row in a lens array. Also, a lens array may be used by itself for focusing light, rather than in combination with another lens array. Further, a lens array assembly may include three or more lens arrays.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. A lens array comprising:
   a plurality of lenses each including first and second lens surfaces; and
   a holder formed integral with the lenses, the holder including a first surface adjacent to the first lens surface and a second surface adjacent to the second lens surface, the second surface being formed with a plurality of recesses;
   wherein the second lens surface of each lens is flat.

2. The lens array according to claim 1, wherein the lenses and the holder are made of a transparent synthetic resin material.

3. The lens array according to claim 1, wherein the recesses and the lenses are arranged alternately.

4. The lens array according to claim 1, wherein the first lens surface of each lens is convex.

5. The lens array according to claim 1, wherein the first lens surface of each lens is concave.

6. The lens array according to claim 1, wherein each of the recesses of the holder is provided with dark-colored light shielding means.

7. The lens array according to claim 1, wherein the second surface of the holder is covered with dark-colored light shielding means defining the second lens surface of each lens.

8. The lens array according to claim 1, wherein the second lens surface of each lens projects from the second surface of the holder.

9. The lens array according to claim 1, wherein the first surface of the holder is covered with dark-colored light shielding means.

10. A lens array assembly comprising:
   a first lens array including a plurality of first lenses and a first holder formed integral with the first lenses; and
   a second lens array including a plurality of second lenses and a second holder formed integral with the second lenses, the second lens array being fixed to the first lens array;
      wherein each of the first lenses includes a non-flat first lens surface and a flat second lens surface opposite to the first lens surface, the first holder being formed with a plurality of recesses adjacent to the second lens surfaces.

11. The lens array assembly according to claim 10, wherein the first lens array is formed with a positioning hole, and the second lens array is formed with a projection fitted into the positioning hole.

12. The lens array assembly according to claim 10, wherein each of the second lenses includes first and second lens surfaces which are both convex.

* * * * *